(12) United States Patent
Hockman et al.

(10) Patent No.: US 12,231,835 B2
(45) Date of Patent: Feb. 18, 2025

(54) VISUAL DISPLAY PANELS FOR INTEGRATED AUDIOVISUAL SYSTEMS

(71) Applicants: Sphere Entertainment Group, LLC, New York, NY (US); Holoplot GmbH, Berlin (DE)

(72) Inventors: Erik Hockman, New York, NY (US); Alex Luthwaite, Lancaster, PA (US); Emad Yacoub Hanna, Berlin (DE)

(73) Assignees: Sphere Entertainment Group, LLC, New York, NY (US); Holoplot GmbH, Berlin (DE)

( * ) Notice: Subject to any disclaimer, the term of this patent is extended or adjusted under 35 U.S.C. 154(b) by 0 days.

(21) Appl. No.: 18/520,995

(22) Filed: Nov. 28, 2023

(65) Prior Publication Data
US 2024/0137678 A1 Apr. 25, 2024

Related U.S. Application Data

(60) Continuation of application No. 17/735,004, filed on May 2, 2022, now Pat. No. 11,843,906, which is a (Continued)

(51) Int. Cl.
*H04R 1/02* (2006.01)
*G06F 3/147* (2006.01)
(Continued)

(52) U.S. Cl.
CPC .............. *H04R 1/028* (2013.01); *G06F 3/147* (2013.01); *H04R 1/403* (2013.01); *H04R 3/12* (2013.01);
(Continued)

(58) Field of Classification Search
CPC ................................................ G02F 1/133603
See application file for complete search history.

(56) References Cited

U.S. PATENT DOCUMENTS 6,215,883 B1   4/2001   Leonarz
7,760,891 B2   7/2010   Biegelsen
(Continued)

FOREIGN PATENT DOCUMENTS

CN   108540899 A   9/2018
CN   109690453 A   4/2019
(Continued)

OTHER PUBLICATIONS

International Search Report and Written Opinion directed to related International Patent Application No. PCT/US2020/037049, mailed Oct. 14, 2020; 11 pages.

(Continued)

*Primary Examiner* — Nan-Ying Yang
(74) *Attorney, Agent, or Firm* — Sterne, Kessler, Goldstein & Fox P.L.L.C.

(57) ABSTRACT

An integrated audio-visual system is disclosed for delivering an event to one or more spectators. The integrated audio-visual system includes one or more loudspeakers that are positioned behind one or more visual displays to be effectively behind the one or more visual displays to be shielded from the field of view of the one or more spectators. The one or more visual displays are specially designed and manufactured to allow sound associated with the event to propagate from the one or more loudspeakers with minimal acoustical distortion and/or minimum acoustical vibration while presenting a visual representation of the event to the one or more spectators. Moreover, the one or more loudspeakers and the one or more visual displays are situated to be a predetermined displacement from each other to further minimize acoustical distortion.

20 Claims, 7 Drawing Sheets

Related U.S. Application Data division of application No. 16/898,142, filed on Jun. 10, 2020, now Pat. No. 11,375,305.

(60) Provisional application No. 62/859,930, filed on Jun. 11, 2019.

(51) Int. Cl.
  *H04R 1/40* (2006.01)
  *H04R 3/12* (2006.01)

(52) U.S. Cl.
  CPC .... *H04R 2201/403* (2013.01); *H04R 2499/15* (2013.01)

(56) References Cited

U.S. PATENT DOCUMENTS

| | | |
|---|---|---|
| 8,879,766 B1 | 11/2014 | Zhang |
| 9,596,531 B1 | 3/2017 | Zhang |
| 10,133,544 B2 | 11/2018 | Helwani et al. |
| 10,206,044 B2 | 2/2019 | Melakari et al. |
| 10,219,075 B2 | 2/2019 | Rakshit |
| 10,321,211 B2 | 6/2019 | Curtinsmith et al. |
| 10,613,699 B2 | 4/2020 | Thompson et al. |
| 10,645,488 B2 | 5/2020 | Devantier et al. |
| 10,848,863 B2 | 11/2020 | Peace |
| 11,030,940 B2 | 6/2021 | Watson et al. |
| 11,146,873 B2 | 10/2021 | Heo et al. |
| 11,375,305 B2 | 6/2022 | Hockman et al. |
| 2005/0105748 A1 | 5/2005 | Bartell |
| 2005/0128399 A1 | 6/2005 | Kim et al. |
| 2008/0159572 A1 | 7/2008 | Corynen |
| 2009/0027566 A1 | 1/2009 | Wargon |
| 2011/0248935 A1 | 10/2011 | Mellow et al. |
| 2012/0082332 A1 | 4/2012 | Park |
| 2013/0127794 A1 | 5/2013 | Todorovich |
| 2013/0329021 A1 | 12/2013 | Fidler et al. |
| 2014/0193016 A1 | 7/2014 | Faerstain et al. |
| 2016/0086521 A1* | 3/2016 | Hall ............ H05K 5/03 445/24 |
| 2017/0048904 A1 | 2/2017 | Monaghan et al. |
| 2018/0343519 A1* | 11/2018 | Rakshit ............ H04R 1/403 |
| 2019/0037165 A1 | 1/2019 | Lee et al. |
| 2019/0182926 A1 | 6/2019 | Engelen et al. |
| 2020/0184968 A1 | 6/2020 | Han et al. |
| 2020/0349880 A1* | 11/2020 | Watson ............ G09G 5/006 |
| 2020/0396527 A1 | 12/2020 | Hockman et al. |
| 2021/0273197 A1* | 9/2021 | Wang ............ H10K 77/111 |
| 2022/0264208 A1 | 8/2022 | Hockman et al. |
| 2022/0264209 A1 | 8/2022 | Hockman et al. |
| 2024/0137679 A1 | 4/2024 | Hockman et al. |

FOREIGN PATENT DOCUMENTS

| | | |
|---|---|---|
| KR | 20130076495 A | 7/2013 |
| WO | WO-2018/065955 A2 | 4/2018 |
| WO | WO 2018/234344 A1 | 12/2018 |

OTHER PUBLICATIONS

Extended European Search Report directed to European Patent Application No. 20822082.2, mailed Jun. 15, 2023; 11 pages.

* cited by examiner

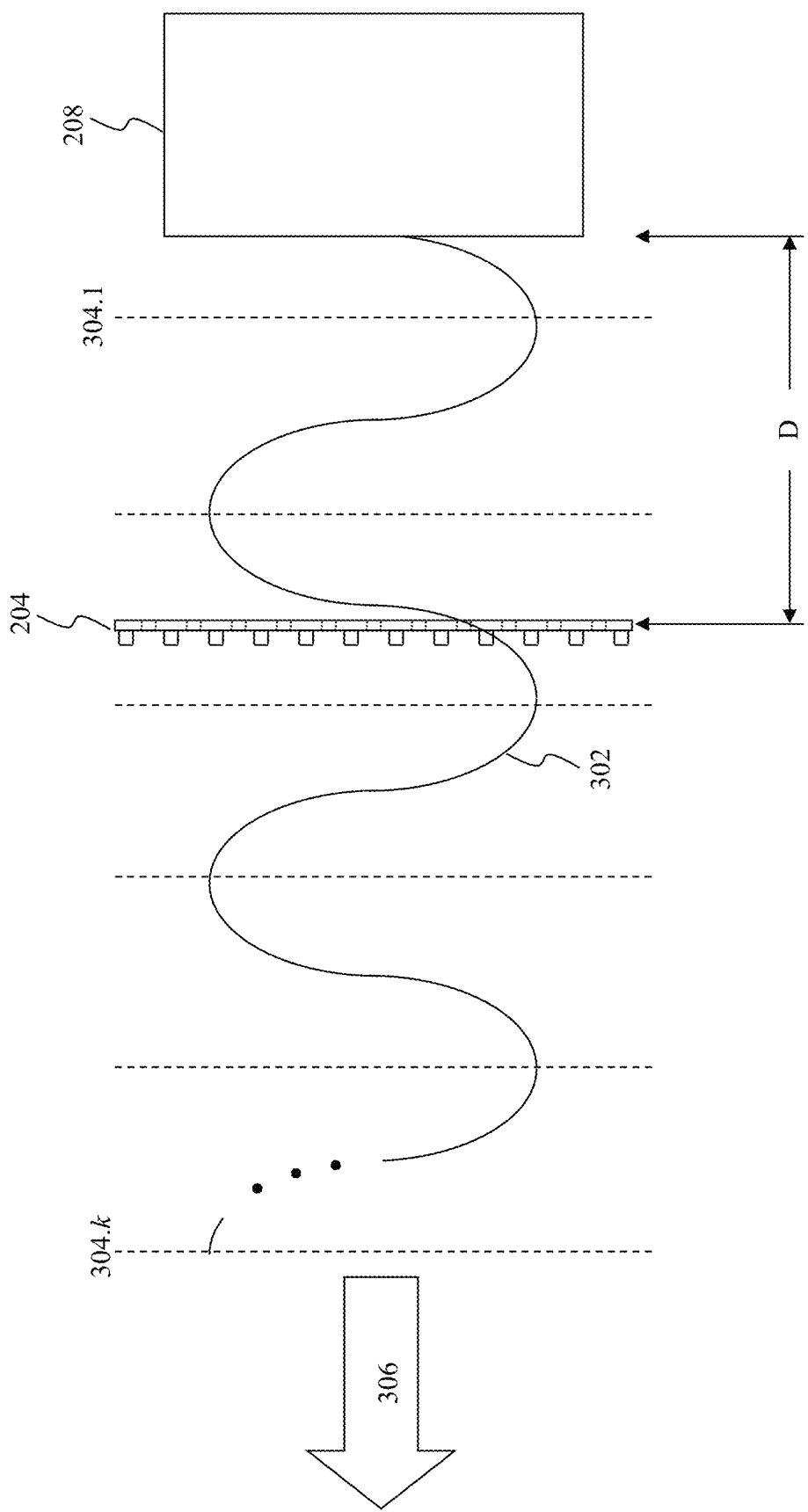

VISUAL DISPLAY PANELS FOR INTEGRATED AUDIOVISUAL SYSTEMS

CROSS REFERENCE TO RELATED APPLICATIONS

This application is a continuation of U.S. patent application Ser. No. 17/735,004, filed on May 2, 2022, now U.S. Pat. No. 11,843,906, which is a divisional of U.S. patent application Ser. No. 16/898,142, now U.S. Pat. No. 11,375,305, filed on Jun. 10, 2020, which claims the benefit of U.S. Provisional Application No. 62/859,930, filed on Jun. 11, 2019, each of which is incorporated herein by reference in its entirety.

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to spectators for their viewing pleasure. Presently, venues, such as music venues and/or sporting venues to provide an example, deliver these events to the spectators using conventional audio-visual systems having various display screens surrounded by loudspeakers in plain sight of the spectators. Not only do these conventional loudspeakers occupy space in the venues that could be used for displaying the event, venues often undergo various measures to cover these conventional loudspeakers from the field of view of the spectators.

BRIEF DESCRIPTION OF THE DRAWINGS

Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion.

FIG. 3A and FIG. 3B illustrate simplified diagrams of exemplary operations of the exemplary integrated audio-visual system according to exemplary embodiments of the present disclosure;

DETAILED DESCRIPTION

Figure 1:
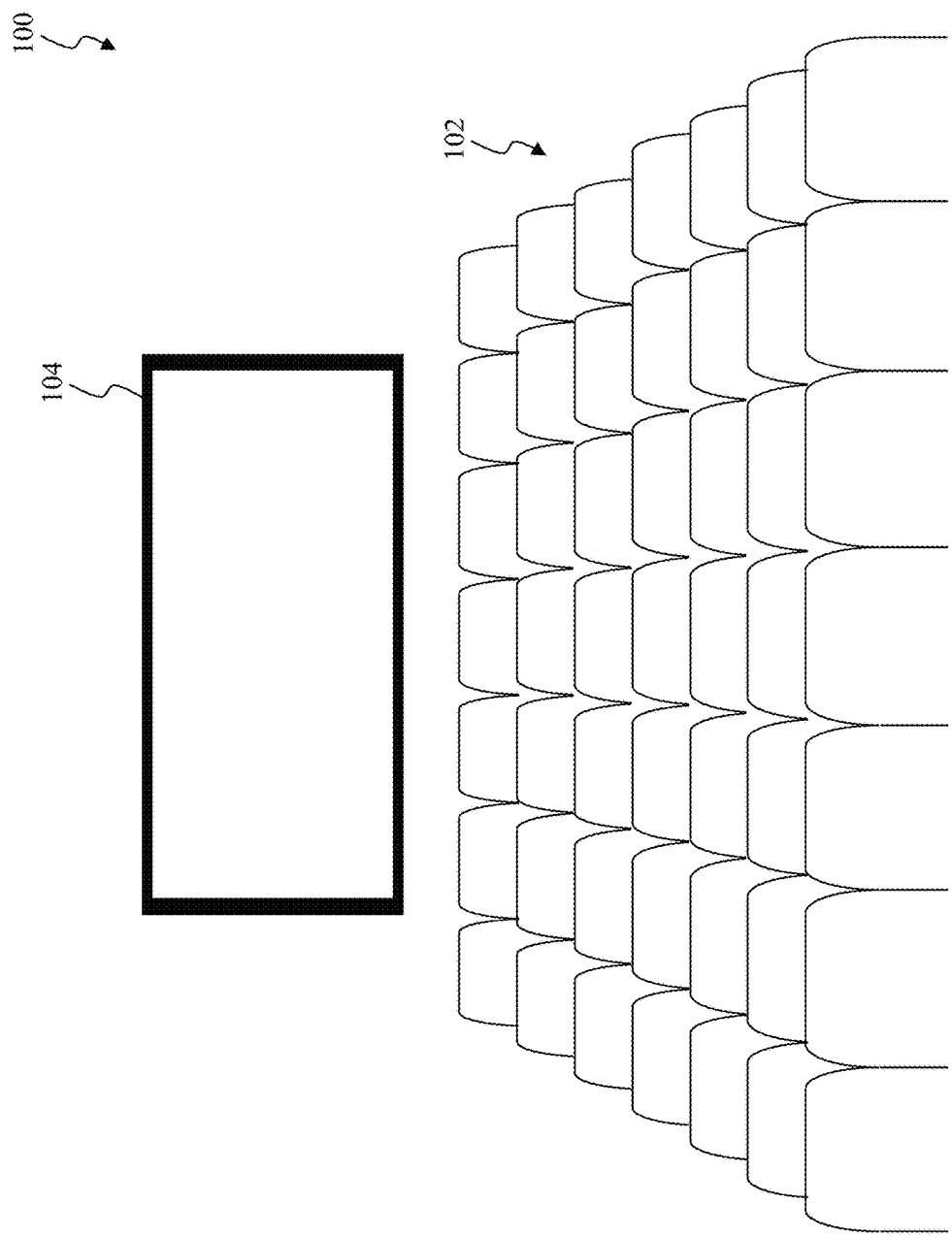
FIG. 1 illustrates a pictorial representation of an exemplary venue according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

An integrated audio-visual system is disclosed for delivering an event to one or more spectators. The integrated audio-visual system includes one or more loudspeakers that are positioned behind one or more visual displays to be effectively behind the one or more visual displays to be shielded from the field of view of the one or more spectators. The one or more visual displays are specially designed and manufactured to allow sound associated with the event to propagate from the one or more loudspeakers with minimal acoustical distortion and/or minimum acoustical vibration while presenting a visual representation of the event to the one or more spectators. Moreover, the one or more loudspeakers and the one or more visual displays are situated to be a predetermined displacement from each other to further minimize acoustical distortion.

Exemplary Venue

FIG. 1 illustrates a pictorial representation of an exemplary venue according to an exemplary embodiment of the present disclosure. In the exemplary embodiment illustrated in FIG. 1, a venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant (s) without departing the spirit and scope of the present disclosure. The event can represent a musical event, a theatrical event, a sporting event, a motion picture, and/or any other suitable event that will be apparent to those skilled in the relevant (s) without departing the spirit and scope of the present disclosure. As illustrated in FIG. 1, one or more spectators 102 experience visual and/or auditory representations of the event delivered from an integrated audio-visual system 104 within the venue 100. Although the discussion of the integrated audio-visual system 104, as well as other integrated audio-visual systems described herein, to follow describes these integrated audio-visual systems as delivering sound and visual representations of an event, those skilled in the relevant art(s) will recognize that the sound and the visual representation delivered by these integrated audio-visual systems need not be related to the same event without departing from the spirit and scope of the present disclosure. For example, these integrated audio-visual systems can deliver sound of a musical song that is unrelated to a visual representation of a motion picture.

As to be described in further detail below, the integrated audio-visual system 104 delivers an audiovisual viewing experience of the event to the one or more spectators 102 through accurate and precise integration of its audiovisual components. For example, the audiovisual components within the integrated audio-visual system 104 can include one or more loudspeakers for delivering sound representing an audio component of the event to the one or more spectators 102. Herein, the terms "loudspeaker" or "loudspeakers" refer to electrical, mechanical, and/or electromechanical devices which convert an electrical audio signal into a corresponding sound. The one or more loudspeakers can include one or more super tweeters, one or more tweeters, one or more mid-range speakers, one or more woofers, one or more subwoofers, one or more full-range speakers to provide some examples. Herein, the term "sound" refers to electrical waveforms in the general audible frequency whose frequency is in the band audible to the average human. Those skilled in the relevant art(s) will recognize the generally accepted standard range of audible frequencies for humans is between approximately 20 Hertz (Hz) and approximately 20 kilohertz (kHz). In some situations, at least some of these loudspeakers can be particularly arranged to form one or more line arrays of loudspeakers. In this example, the audiovisual components within the integrated audio-visual system 104 can further include one or more visual displays, such as one or more light-emitting diode (LED) displays, one or more organic light-emitting diode (OLED) displays, and/or one or more quantum dots (QDs) displays to provide some examples, for delivering a visual component of the event to the one or more spectators 102.

The one or more visual displays, as to be further described in more detail below, are specially designed and manufactured to allow sound associated with the event to propagate from the one or more loudspeakers to the one or more spectators 102 with minimal acoustical distortion and/or minimum acoustical vibration while presenting the visual representation of the event to the one or more spectators 102. For example, the one or more visual displays are particularly designed and manufactured onto one or more substrates, such as printed circuit board substrates or semiconductor substrates to provide some examples, having openings to allow the sound associated with the event to propagate from the one or more loudspeakers effectively passing through the one or more visual displays onto the one or more spectators 102. Moreover, the one or more loudspeakers and the one or more visual displays are situated within the integrated audio-visual system 104 to be a predetermined displacement distance from each other. This predetermined displacement can allow for the formation of one or more wavefronts of the sound before the sound passes through the openings of the one or more visual displays to further minimize acoustical distortion.

Figure 2:
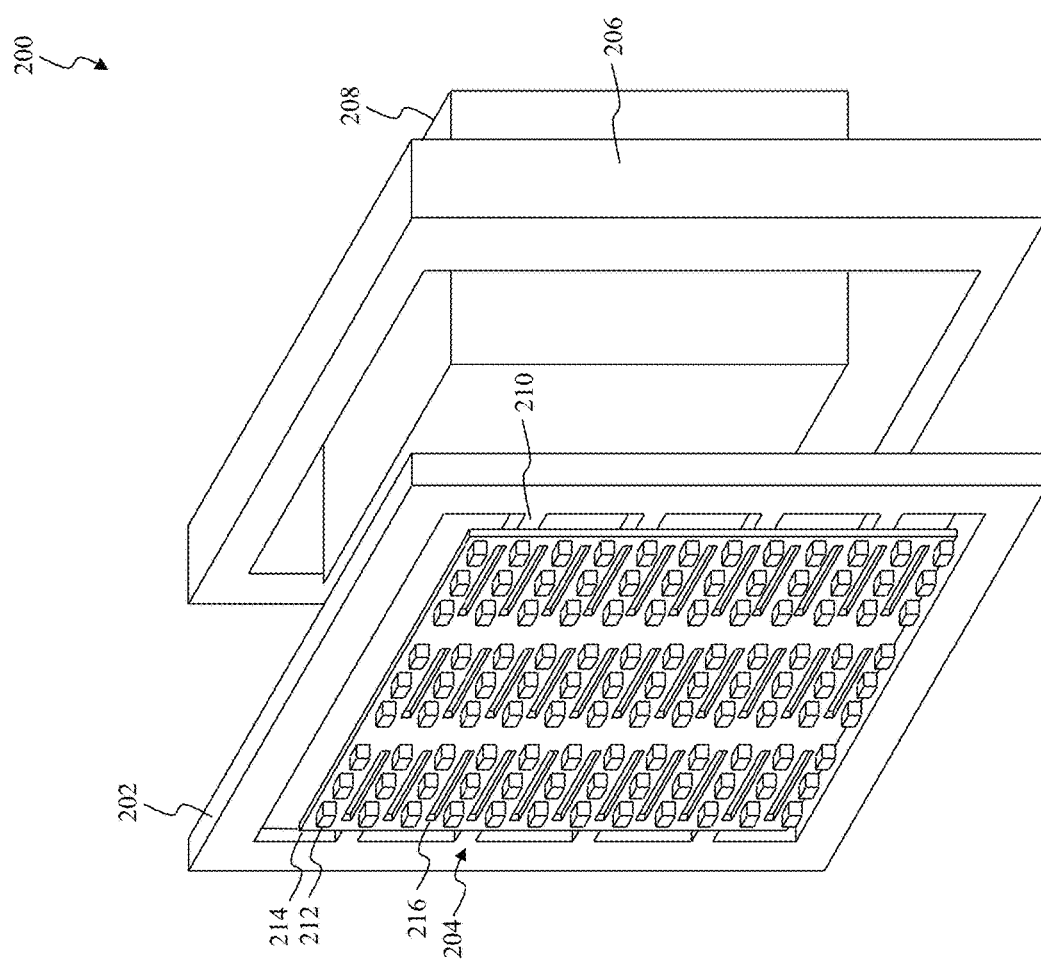
FIG. 2 illustrates a pictorial representation of an exemplary integrated audio-visual system that can be implemented within the exemplary venue according to an exemplary embodiment of the present disclosure.

Exemplary Integrated Audio-Visual System that can be Implemented within the Exemplary Venue FIG. 2 illustrates a pictorial representation of an exemplary integrated audio-visual system that can be implemented within the exemplary venue according to an exemplary embodiment of the present disclosure. As to be described below, an integrated audio-visual system 200 is specially designed and manufactured to allow sound representing an audio component of an event to propagate through one or more visual displays while these visual displays are delivering a visual representation of the event. As illustrated in FIG. 2, the integrated audio-visual system 200 includes a visual display mechanical housing 202, a visual display 204, a loudspeaker mechanical housing 206, and one or more loudspeakers 208. The integrated audio-visual system 200 can represent an exemplary embodiment of the integrated audio-visual system 104 as described above in FIG. 1.

The visual display mechanical housing 202 represents a mechanical housing for securing the visual display 204. The visual display mechanical housing 202 can be implemented using one or more metallic materials, such as iron, steel, copper, bronze, brass, aluminum, or magnesium to provide some examples, one or more non-metallic materials, such as wood, plastic, or glass, and/or any combination thereof. As illustrated in FIG. 2, the visual display mechanical housing 202 represents a frame or a housing for mechanically securing the visual display 204 from substantial acoustical vibration that can occur as the sound passes through the visual display 204. As to be described in further detail below, the visual display 204 can include multiple visual display panels that functionally cooperate to deliver the visual representation of the event. In the exemplary embodiment illustrated in FIG. 2, the visual display mechanical housing 202 can include one or more mechanical cross members 210 for securing the multiple visual display panels to the visual display mechanical housing 202. The one or more mechanical cross members 210 can be designed and manufactured to allow the sound associated with the event to propagate from the one or more loudspeakers 208 through the visual display mechanical housing 202 with minimal distortion and/or minimum acoustical vibration.

The visual display 204 delivers a visual component of the event. In the exemplary embodiment illustrated in FIG. 2, the visual display 204 includes multiple visual display panels that functionally cooperate to deliver the visual representation of the event. In this exemplary embodiment, these multiple visual display panels are mechanically attached to the visual display mechanical housing 202 using the one or more mechanical cross members 210. For example, these multiple visual display panels can be arranged as a series of rows and a series of columns of visual display panels to form an array of visual display panels. In this example, rows of visual display panels can be mechanically attached to the mechanical cross members 210. Moreover, the multiple visual display panels include visual emission elements 212, such as light-emitting diodes (LEDs), organic light-emitting diode (OLEDs), and/or quantum dots (QDs) to provide some examples, to deliver the visual representation of the event. In an exemplary embodiment, the visual emission elements 212 can be arranged as a series of rows and a series of columns of visual emission elements to form an array of visual emission elements 212 to deliver the visual representation of the event as illustrated in FIG. 2. However, those skilled in the relevant art(s) will recognize other arrangements as possible for the visual emission elements 212 without departing from the spirit and scope of the present disclosure. As additionally illustrated in FIG. 2, the visual emission elements 212 can be situated onto a substrate 214, such as a printed circuit board substrate or a semiconductor substrate to provide some examples. In an exemplary embodiment, the visual emission elements 212 can be situated onto the substrate 214 using reflow soldering and/or wave soldering to provide some examples. In this exemplary embodiment, the substrate 214 can include an arrangement of pads, also referred to as footprints, to attach the visual emission elements 212 onto the substrate 214. As further illustrated in FIG. 2, the substrate 214 can include one or more openings 216 to allow the sound associated with the event to propagate through the visual display 204 with minimal distortion and/or vibration as to be described in further detail below. The one or more openings 216 represent geometric regions within the visual display 204 in which the substrate 214 has been removed. In the exemplary embodiment illustrated in FIG. 2, the one or more openings 216 can be characterized as being rectangular geometric shapes as illustrated in FIG. 2, circular geometric shapes, or polygonal geometric shapes to provide some examples, and/or any suitable irregular geometric shapes, such as an irregular polygonal geometric shapes to provide an example are possible without departing from the spirit and scope of the present disclosure. It should be noted that the visual emission elements 212 and/or the number of the one or more openings 216 illustrated in FIG. 2 are for exemplary purposes only. Those skilled in the relevant art(s) will recognize the visual display 204 can include more or less visual emission elements 212 and/or the number of the one or more openings 216 than illustrated in FIG. 2 without departing from the spirit and scope of the present disclosure.

The loudspeaker mechanical housing 206 represents a mechanical housing for securing the one or more loudspeakers 208 to be effectively behind the visual display 204. The loudspeaker mechanical housing 206 can be implemented using one or more metallic materials, such as iron, steel, copper, bronze, brass, aluminum, or magnesium to provide some examples, one or more non-metallic materials, such as wood, plastic, or glass, and/or any combination thereof. As illustrated in FIG. 2, the loudspeaker mechanical housing 206 represents a frame or a housing for mechanically securing the one or more loudspeakers 208. In an exemplary embodiment, the loudspeaker mechanical housing 206 is designed and manufactured to mechanically dampen at least some of the acoustical vibration generated by the one or more loudspeakers 208 in providing the sound. In the exemplary embodiment illustrated in FIG. 2, the loudspeaker mechanical housing 206 mechanically positions the one or more loudspeakers 208 to be effectively behind the visual display 204 to be shielded from the field of view of the one or more spectators.

The one or more loudspeakers 208 deliver the sound representing an audio component of the event. The one or more loudspeakers 208 can include one or more super tweeters, one or more tweeters, one or more mid-range speakers, one or more woofers, one or more subwoofers, one or more full-range speakers, and/or any other suitable device that is capable of reproducing the audible frequency range, or a portion thereof, that will be apparent to those skilled in the relevant art(s) without departing from the spirit and scope of the present disclosure. In some situations, the one or more loudspeakers 208 can include multiple loudspeakers mounted in a theoretical line to form one or more line arrays of loudspeakers which are fed in phase. In some situations, loudspeakers within each line array of loudspeakers are of similar speaker type, for example, super tweeters, tweeters, mid-range speakers, woofers, subwoofers, or full-range speakers. In other situations, multiple line arrays of loudspeakers can be stacked onto each other at slightly different vertical angles to cover a greater depth of field than a single line array of loudspeakers. As to be described in further detail below, the visual display 204 and the one or more loudspeakers 208 are situated to be a predetermined displacement from each other. This predetermined displacement allows for the formation of the sound by the one or more loudspeakers 208 before the sound passes through the openings of the visual display 204 to further minimize acoustical distortion.

Exemplary Operation of the Exemplary Integrated Audio-Visual System

Figure 3B:
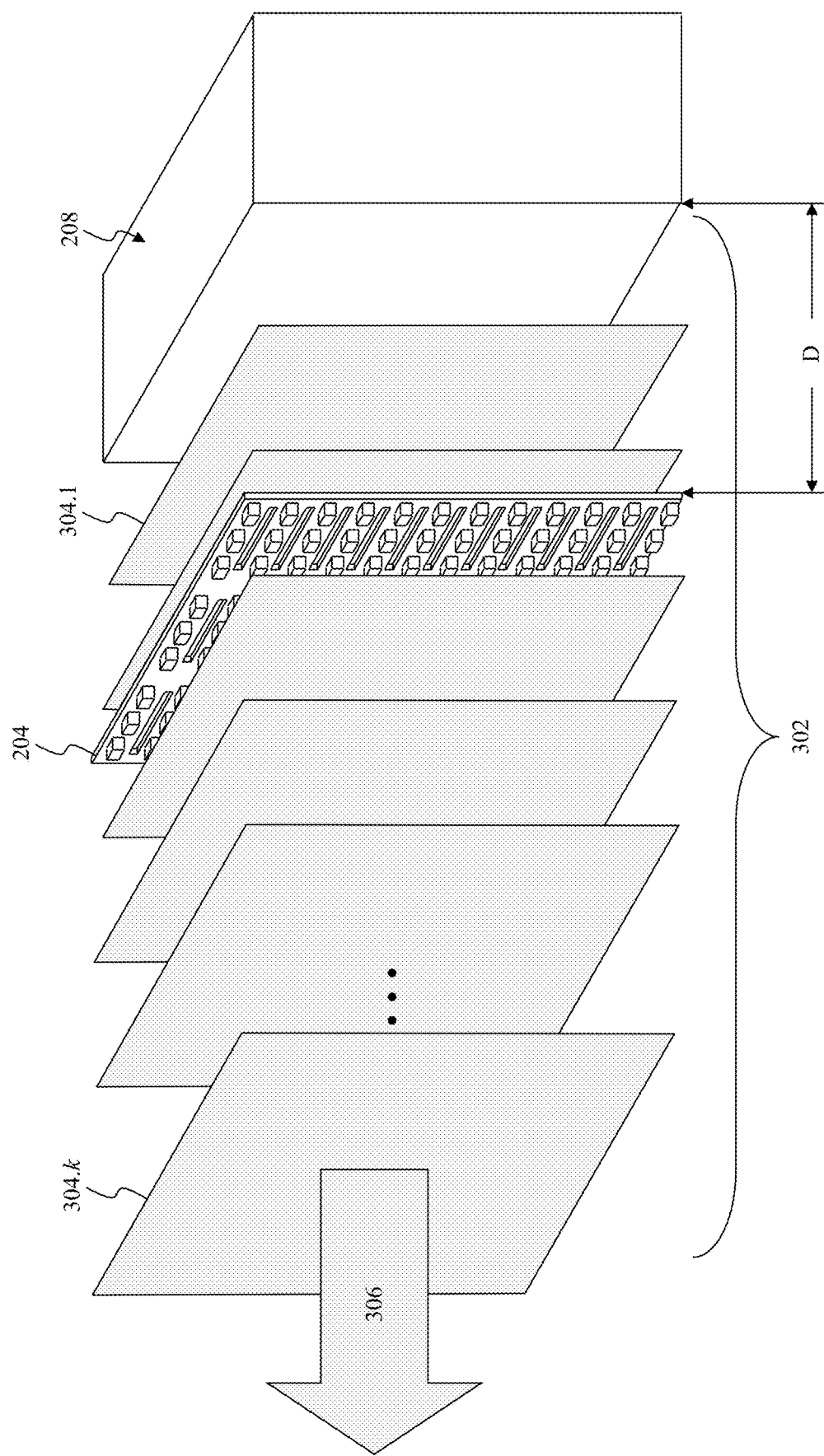

FIG. 3A and FIG. 3B illustrate simplified diagrams of exemplary operations of the exemplary integrated audio-visual system according to exemplary embodiments of the present disclosure. As described above in FIG. 2, the one or more auditory speakers 208 generate an auditory waveform representing an audio component of an event which propagates through the visual display 204 while the visual display 204 is delivering a visual representation of the event. As illustrated in FIG. 3A, the one or more loudspeakers 208 generate sound 302 representing the audio component of the event which propagates through the visual display 204. FIG. 3A illustrates an exemplary side view of the visual display 204 and the one or more loudspeakers 208. Those skilled in the relevant art(s) will recognize the waveform 302 can differ from that depicted in FIG. 3A and FIG. 3B based upon different implementations of the visual display 204 and/or the one or more loudspeakers 208 without departing from the spirit and scope of the present disclosure. In the exemplary embodiment illustrated in FIG. 3A, the sound 302 represents a plane wave that can be characterized by planar wavefronts 304.1 through 304.$k$. The planar wavefronts 304.1 through 304.$k$, which represent surfaces of constant phase of the sound 302, are further illustrated in FIG. 3B as being parallel planes normal to a phase velocity vector 306.

In the exemplary embodiments illustrated in FIG. 3A and FIG. 3B, the visual display 204 can introduce acoustical distortion into the sound 302 as the sound 302 propagates through the openings of the visual display 204. However, as illustrated in FIG. 3A and FIG. 3B and described above, the visual display 204 and the one or more loudspeakers 208 can be situated to be a predetermined displacement, denoted as displacement distance D in FIG. 3A and FIG. 3B, from each other to minimize this acoustical distortion. The displacement distance D allows for one or more of the planar wavefronts 304.1 through 304.$k$ to be formed before the sound 302 passes through the openings of the visual display 204 to minimize acoustical distortion of the sound 302 as the sound 302 propagates through the openings of the visual display 204. In an exemplary embodiment, the displacement distance D is approximately 50 centimeters (cm).

Figure 4:
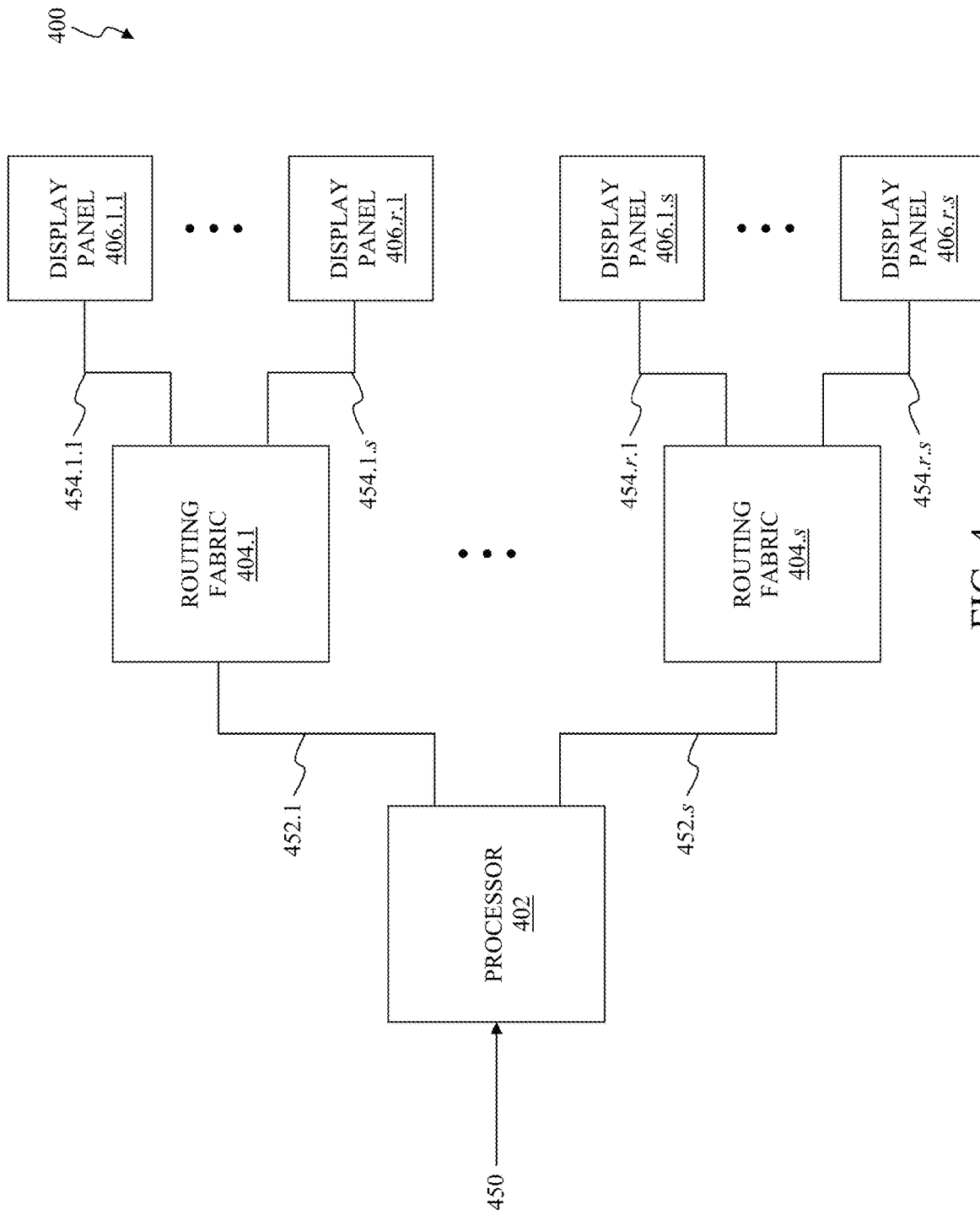
FIG. 4 illustrates a block diagram of an exemplary visual display that can be implemented within the exemplary integrated audio-visual system according to an exemplary embodiment of the present disclosure.

Exemplary Visual Display that can be Implemented within the Exemplary Integrated Audio-Visual System FIG. 4 illustrates a block diagram of an exemplary visual display that can be implemented within the exemplary integrated audio-visual system according to an exemplary embodiment of the present disclosure. A visual display system 400 delivers a visual component of an event to one or more spectators as described above. In the exemplary embodiment illustrated in FIG. 4, the visual display system 400 includes a processor 402, routing fabric 404.1 through 404.$s$, and visual display panels 406.1.1 through 406.$r.s$. The visual display system 400 can represent an exemplary embodiment of the visual display 204 as described above in FIG. 2.

The processor 402 controls overall configuration and/or operation of the visual display system 400. In an exemplary embodiment, the processor 402 can be situated remote from the routing fabric 404.1 through 404.$s$ and the visual display panels 406.1.1 through 406.$r.s$. For example, the visual display system 400 can be located within a venue, such as the venue 100 as described above. In this example embodiment, the processor 402 can be implemented using a series of one or more processors that can be mounted in one or more equipment racks in a different location, for example, a different room, within the venue than the visual display panels 406.1.1 through 406.$r.s$. In the exemplary embodiment illustrated in FIG. 4, the processor 402 receives digital video data 450 representing the visual component of the event to deliver to the one or more spectators. Preferably, the event can be pre-recorded onto stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Thereafter, a media distribution system can provide the event is stored on the machine-readable medium to the processor as the digital video data 450. This media distribution system can be within a venue, such as the venue 100, or outside of the venue with capabilities to service multiple venues. Alternatively, the digital video data 450 representing the event can be streamed to the processor 402 in real-time, or near real-time, as the event is occurring. In an exemplary embodiment, the processor 402 can supplement the digital video data 450 with supplemental digital data, such as virtual advertising and graphic effects, prior to delivering the digital video data 450 to the visual display panels 406.1.1 through 406.$r.s$.

The processor 402 processes the digital video data 450 to provide the control signals 452.1 through 452.$s$. In the exemplary embodiment illustrated in FIG. 4, each control signal from among the control signals 452.1 through 452.$s$ configures a corresponding group of visual display panels from among the visual display panels 406.1.1 through 406.$r.s$, for example, a corresponding column of visual display panels, to deliver their corresponding portion of the visual component of the event to one or more spectators. For example, the processor 402 can map, referred to as pixel map, the digital video data 450 from an image space into a display space for display onto the visual display panels 406.1.1 through 406.$r.s$. In this example, the pixels of the digital video data 450 can be assigned to various coordinates in the image space and the visual display panels 406.1.1 through 406.$r.s$ can be assigned to various coordinates in the display space. In this example, the processor 402 translates or maps the pixels of the digital video data 450 from the image space to the display space. Thereafter, the processor 402 provides the control signals 452.1 through 452.$s$ to cause the display panels 406.1.1 through 406.$r.s$ to display the digital video data 450 in the display space. In an exemplary embodiment, the control signals 452.1 through 452.$s$ can represent serial control signals with these serial control signals corresponding to groups of visual display panels from among the visual display panels 406.1.1 through 406.$r.s$, for example, corresponding columns of visual display panels. Alternatively, or in addition to, the control signals 452.1 through 452.$s$ can represent parallel control signals with these parallel control signals corresponding to individual visual display panels from among the visual display panels 406.1.1 through 406.$r.s$. In some situations, the digital video data 450 can be encoded in accordance with a video coding format, such as a version of a Moving Picture Experts Group (MPEG) video coding format or a version of an AOMedia Video 1 (AV1) video coding format to provide some examples. In these situations, the processor 402 decodes the digital video data 450 in accordance with the format before processing the digital video data 450, as to be described in further detail below, for delivery to the visual display panels 406.1.1 through 406.$r.s$. Optionally, the processor 402 can perform motion compensation, inverse discrete cosine transforms (iDCTs), inverse modified discrete cosine transforms (iMDCTs), in-loop deblocking filters, intra-frame predictions, inverse quantizations (IQs), variable-length decoding (VLD), spatial-temporal deinterlacing, automatic interlace/progressive source detection, and/or bit-stream processing and perfect pixel positioning to manipulate the images, or the series or images, of the event within the digital video data 450.

The routing fabric 404.1 through 404.$s$ selectively routes the control signals 452.1 through 452.$s$ for delivery to the visual display panels 406.1.1 through 406.$r.s$ as control signals 454.1.1 through 454.$r.s$. In some situations, the processor 402 can be communicatively coupled to the routing fabric 404.1 through 404.$s$ using suitable communication mediums, such as one or more Ethernet networking cables, such as one or more category 5 (Cat 5) or category 6 (Cat 6) Ethernet networking cables to provide some examples, one or more optical fiber cables, and/or one or more copper core communication cables, such as one or more coaxial cables, one or more ribbon cables, one or more shielded cables, and/or one or more twinax cables to provide some examples. In the exemplary embodiment illustrated in FIG. 4, the routing fabric 404.1 through 404.$s$ can convert the control signals 452.1 through 452.$s$ from serial control signals to provide the as control signals 454.1.1 through 454.$r.s$ as parallel control signals for delivery to the visual display panels 406.1.1 through 406.$r.s$. As to be described in further detail below, the visual display panels 406.1.1 through 406.$r.s$ can be arranged as a series of r rows and a series of s columns of visual display panels to form an array of visual display panels.

The visual display panels 406.1.1 through 406.$r.s$ utilize the control signals 454.1.1 through 454.$r.s$ to collectively deliver the visual component of the event to one or more spectators. In an exemplary embodiment, the visual display panels 406.1.1 through 406.$r.s$ can be arranged as a series of r rows and a series of s columns of visual display panels to form an array of visual display panels. In the exemplary embodiment illustrated in FIG. 4, the visual display panels 406.1.1 through 406.$r.s$ utilize the control signals 454.1.1 through 454.$r.s$ to control operation of various visual emission elements of the visual display panels 406.1.1 through 406.$r.s$ to collectively deliver the visual component of the event to one or more spectators. In this exemplary embodiment, the control signals 454.1.1 through 454.$r.s$ can represent power signals, ground signals, clocking signals, and/or any other suitable signal that can be used to control the operation of the various visual emission elements that will be apparent to those skilled in the relevant art(s) without departing from the spirit and scope of the present disclosure. Moreover, the various visual emission elements can include light-emitting diodes (LEDs), organic light-emitting diode (OLEDs), quantum dots (QDs), and/or any combination thereof to deliver the visual representation of the event. The control signals 454.1.1 through 454.$r.s$ can be utilized to activate, or turn-on, these various visual emission elements to emit light with the color and/or intensity of the light being dependent upon chemical properties of the various visual emission elements. Alternatively, or in addition to, the control signals 454.1.1 through 454.$r.s$ can be utilized to deactivate, or turn-off, these various visual emission elements to not emit light. For example, the control signals 454.1.1 through 454.$r.s$ can be configured to forward bias the various visual emission elements to activate these visual emission elements or to reverse bias the various visual emission elements to deactivate these visual emission elements.

Figure 5:
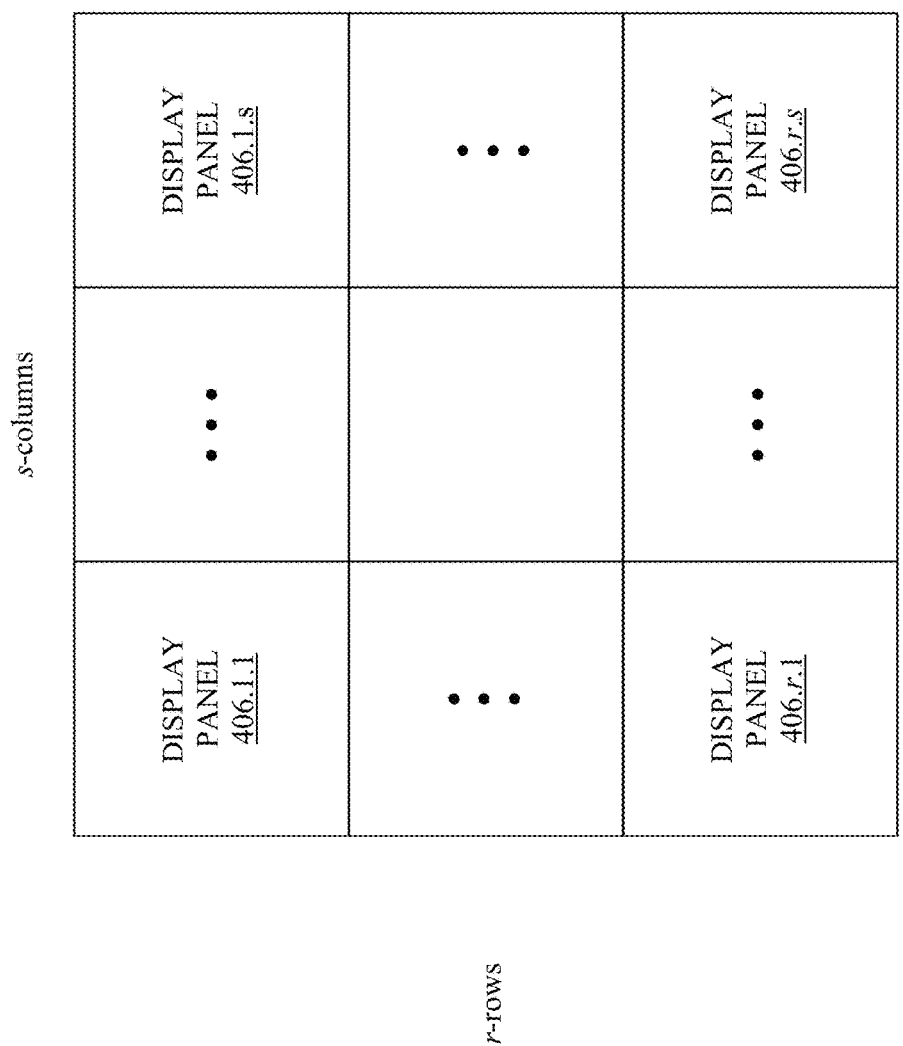
FIG. 5 illustrates an exemplary arrangement of visual display panels that that can be implemented within the exemplary integrated audio-visual system according to an exemplary embodiment of the present disclosure.

Exemplary Arrangement of Visual Display Panels that can be Implemented within the Exemplary Integrated Audio-Visual System FIG. 5 illustrates an exemplary arrangement of visual display panels that that can be implemented within the exemplary integrated audio-visual system according to an exemplary embodiment of the present disclosure. As described above in FIG. 4, the visual display panels 406.1.1 through 406.*r.s* can be arranged as the series of r rows and the series of s columns of visual display panels to form the array of visual display panels. FIG. 5 illustrates such an arrangement of the visual display panels 406.1.1 through 406.*r.s* in the series of r rows and the series of s columns.

Figure 6:
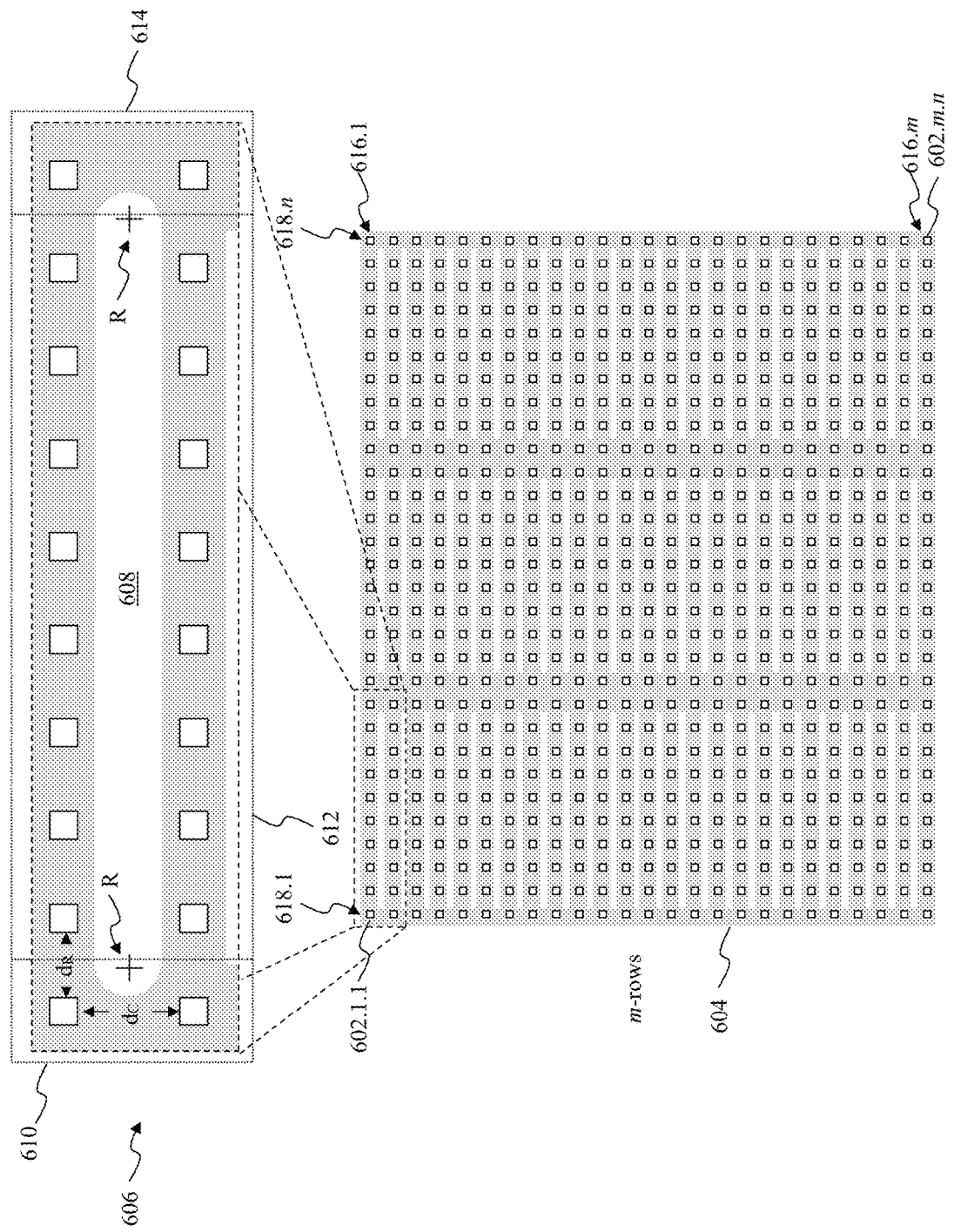
FIG. 6 illustrates an exemplary visual display panel that that can be implemented within the exemplary integrated audio-visual system according to an exemplary embodiment of the present disclosure.

Exemplary Visual Display Panel that can be Implemented within the Exemplary Integrated Audio-Visual System FIG. 6 illustrates an exemplary visual display panel that that can be implemented within the exemplary integrated audio-visual system according to an exemplary embodiment of the present disclosure. In the exemplary embodiment illustrated in FIG. 6, a visual display panel 600 can be specially designed and manufactured to allow sound, such as the sound 302 as described above in FIG. 3, of an event to propagate from one or more loudspeakers to one or more spectators of the event with minimal acoustical distortion and/or minimum acoustical vibration while presenting a visual representation of the event to the one or more spectators. As to be described below, the visual display panel 600 is particularly designed and manufactured onto a printed circuit board substrate having openings to allow the sound associated with the event to propagate from the one or more loudspeakers effectively passing through the visual display panel 600 onto the one or more spectators. As illustrated in FIG. 6, the visual display panel 600 includes visual emission elements 602.1.1 through 602.*m.n* that are situated onto a printed circuit board substrate 604.

In the exemplary embodiment illustrated in FIG. 6, the visual emission elements 602.1.1 through 602.*m.n* can be arranged in a series of m rows and a series of n columns onto the printed circuit board substrate 604 to form a rectangular array of visual emission elements. However, those skilled in the relevant art(s) will recognize other arrangements for the visual emission elements 602.1.1 through 602.*m.n* are possible without departing from the spirit and scope of the present disclosure. For example, the visual emission elements 602.1.1 through 602.*m.n* and/or the printed circuit board substrate 604 can be any suitable regular geometric shape, such as a rectangular geometric shape as illustrated in FIG. 6, a circular geometric shape, or a polygonal geometric shape to provide some examples, and/or any suitable irregular geometric shape, such as an irregular polygonal geometric shape to provide an example are possible without departing from the spirit and scope of the present disclosure. Furthermore, although the visual emission elements 602.1.1 through 602.*m.n* and the printed circuit board substrate 604 have similar geometric arrangement in FIG. 6, those skilled in the relevant art(s) will recognize the geometric arrangements of the visual emission elements 602.1.1 through 602.*m.n* and the printed circuit board substrate 604 can differ without departing from the spirit and scope of the present disclosure. In an exemplary embodiment, the visual emission elements 602.1.1 through 602.*m.n* can be situated onto the printed circuit board substrate 604 using reflow soldering and/or wave soldering to provide some examples. The visual emission elements 602.1.1 through 602.*m.n* can be implemented using light-emitting diodes (LEDs), organic light-emitting diodes (OLEDs), and/or one or more quantum dots (QDs) to provide some examples.

Moreover, visual emission elements 602.1.1 through 602.*m.n* from each row from among the series of m rows are spaced apart from each other by an approximate row distance $d_R$ and visual emission elements 602.1.1 through 602.*m.n* from each column from among the series of n columns are spaced apart from each other by an approximate column distance dc as illustrated in an exploded view 606 of the visual display panel 600 in FIG. 6. In an exemplary embodiment, the row distance $d_R$ and the column distance dc are equidistant, for example, approximately six (6) millimeters (mm) or approximately nine (9) mm. However, those skilled in the relevant art(s) will recognize that the spacing between the visual emission elements 602.1.1 through 602.*m.n* can be different than as depicted in FIG. 6 without departing from the spirit and scope of the present disclosure. The row distance $d_R$ and the column distance dc are selectively chosen to provide a relatively smooth viewing experience of the visual representation of the event to the one or more spectators while taking into consideration the acoustical distortion of the sound associated with the event as it propagates through the visual display panel 600 to the one or more spectators. As to be described in further detail below, the visual display panel 600 includes openings 608 to allow the sound associated with the event to propagate from the one or more loudspeakers effectively passing through the visual display panel 600 onto the one or more spectators. And as illustrated in FIG. 6, sizes and/or shapes of the openings 608 are bound by the row distance $d_R$ and the column distance dc with greater row distances $d_R$ and/or greater column distances dc allowing for larger openings 608. However, if the row distances $d_R$ and/or the column distances dc are too large, the visual representation of the event can appear pixelated to the one or more spectators. On the other hand, if the row distances $d_R$ and/or the column distances dc are too small, the visual display panel 600 can cause significant acoustical distortion of the sound associated with the event as the sound propagates through the visual display panel 600.

As described above, the visual display panel 600 includes the openings 608 to allow the sound associated with the event to propagate from the one or more loudspeakers to the one or more spectators. As illustrated in FIG. 6, the openings 608 represent geometric regions within the visual display panel 600 in which the printed circuit board substrate 604 has been removed. In the exemplary embodiment illustrated in FIG. 6, the openings 608 can be characterized as being rectangular geometric shapes as illustrated in FIG. 6, circular geometric shapes, or polygonal geometric shapes to provide some examples, and/or any suitable irregular geometric shapes, such as an irregular polygonal geometric shapes to provide an example are possible without departing from the spirit and scope of the present disclosure. Optionally, the openings 608 can be radially shaped in accordance with a radius R as illustrated in FIG. 6. This optional radial shaping effectively shapes transitions between edges of the openings 608 to further minimize distortion of the sound as the sound propagates through the visual display panel 600.

In the exemplary embodiment illustrated in FIG. 6, the openings 608 traverse between columns from among the series of n columns of visual emission elements 602.1.1 through 602.*m.n*. As illustrated in the exploded view 606, the openings 608 traverse from a first set 610 of visual emission elements from among the visual emission elements 602.1.1 through 602.*m.n* along a first column from among the n columns through a second set 612 of visual emission elements from among the visual emission elements 602.1.1 through 602.*m.n* to a third set 614 of visual emission elements from among the visual emission elements 602.1.1 through 602.*m.n* along a second column from among the n columns. This illustrated arrangement of the openings 608 in the exploded view 606 allows control signals, such as the control signals 454.1.1 through 454.*r.s* to provide an example, to be routed through the series of m rows and the series of n columns to control the operation of the visual emission elements 602.1.1 through 602.*m.n*. As illustrated in FIG. 6, the visual display panel 600 includes transmission lines 616.1 through 616.*m* and transmission lines 618.1 through 618.*n* to route these control signals through the series of m rows and the series of n columns to control the operation of the visual emission elements 602.1.1 through 602.*m.n*. The transmission lines 616.1 through 616.*m* and transmission lines 618.1 through 618.*n* can be implemented using planar waveguides, such as stripline or microstrip to provide some examples. In the exemplary embodiment illustrated in FIG. 6, the transmission lines 616.1 through 616.*m* are situated along rows from among the series of m rows to route these control signals to visual emission elements 602.1.1 through 602.*m.n* along these rows and the transmission lines 618.1 through 618.*n* are situated along rows from columns the series of n columns to route these control signals to rows along these columns. Alternatively, or in addition to, the transmission lines 618.1 through 618.*n* route these control signals to visual emission elements 602.1.1 through 602.*m.n* along these columns and the transmission lines 616.1 through 616.*m* route these control signals to columns along these rows.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A visual display for an integrated audio-visual system, the visual display comprising:
    a first visual display panel from among a plurality of visual display panels, the first visual display panel comprising:
    a plurality of visual emission elements situated along a first plurality of rows of visual emission elements and a first plurality of columns of visual emission elements, the plurality of visual emission elements being grouped into a plurality of first sets of visual emission elements, a plurality of second sets of visual emission elements, and a plurality of third sets of visual emission elements,
    a plurality of openings, at least one opening from among the plurality of openings beginning between a corresponding first set of visual emission elements from among the plurality of first sets of visual emission elements and a corresponding second set of visual emission elements from among the plurality of second sets of visual emission elements, traversing along the corresponding second set of visual emission elements, and ending between the corresponding second set of visual elements and a corresponding third set of visual emission elements from among the plurality of third sets of visual emission elements, wherein the corresponding first set of visual emission elements comprises adjacent visual emission elements along a corresponding first column among the first plurality of columns of visual emission elements, wherein the corresponding third set of visual emission elements comprises adjacent visual emission elements along a corresponding second column among a second plurality of columns of visual emission elements, and wherein the corresponding second set of visual emission elements comprises adjacent rows of visual emission elements among the first plurality of rows of visual emission elements situated between the corresponding first column and the corresponding second column; and a second visual display panel from among the plurality of visual display panels, the first visual display panel and the second visual display panel being arranged along a first plurality of rows of visual display panels and a first plurality of columns of visual display panels to form the visual display.

2. The visual display of claim 1, wherein the plurality of openings is configured to pass sound that is generated behind the visual display through the first visual display panel.

3. The visual display of claim 2, wherein the plurality of openings is configured to pass the sound that is generated from a loudspeaker that is behind the visual display, the sound being associated with an event being hosted by a venue.

4. The visual display of claim 1, wherein the first visual display panel further comprises a substrate, and
wherein the plurality of openings comprises a plurality of geometric regions situated within the substrate having the substrate removed.

5. The visual display of claim 1, wherein the first plurality of rows of visual emission elements and the first plurality of columns of visual emission elements are arranged to form a rectangular array of visual emission elements.

6. The visual display of claim 1, wherein the plurality of openings are configured to be a plurality of geometric shapes.

7. The visual display of claim 5, wherein at least one geometric shape from among the plurality of geometric shapes is radially shaped along the corresponding first column of visual emission elements in accordance with a radius and along the corresponding second column of visual emission elements in accordance with the radius.

8. The visual display of claim 1, wherein visual emission elements from among the plurality of visual emission elements along each row from among the first plurality of rows of visual emission elements are separated by a row distance,
wherein visual emission elements from among the plurality of visual emission elements along each column from among the first plurality of columns of visual emission elements are separated by a column distance, and
wherein the row distance is equal to the column distance.

9. A visual display panel, comprising:
a substrate;
a plurality of visual emission elements situated onto the substrate along a plurality of rows of visual emission elements and a plurality of columns of visual emission elements; and
at least one opening situated within the substrate, the at least one opening comprising a geometric shape situated within the substrate having the substrate removed, the geometric shape beginning between a first set of visual emission elements from among the plurality of visual emission elements along a first column of visual emission elements from among the plurality of columns of visual emission elements and a second set of visual emission elements from among the plurality of visual emission elements between the first column of visual emission elements and a second column of visual emission elements from among the plurality of columns of visual emission elements, traversing through the second set of visual emission elements along adjacent rows of visual emission elements from among the plurality of rows of visual emission elements, and ending between the corresponding second set of visual elements and a third set of visual emission elements from among the plurality of visual emission elements along the second column of visual emission elements.

10. The visual display panel of claim 9, wherein the at least one opening is configured to pass sound that is generated behind the visual display panel through the geometric shape.

11. The visual display panel of claim 10, wherein the at least one opening is configured to pass the sound that is generated from a loudspeaker that is behind the visual display, the sound being associated with an event being hosted by a venue.

12. The visual display panel of claim 9, wherein the plurality of rows of visual emission elements and the plurality of columns of visual emission elements are arranged to form a rectangular array of visual emission elements.

13. The visual display panel of claim 9, wherein the geometric shape is radially shaped along the first column of visual emission elements in accordance with a radius and along the second column of visual emission elements in accordance with the radius.

14. The visual display panel of claim 9, wherein visual emission elements from among the plurality of visual emission elements along each row from among the plurality of rows of visual emission elements are separated by a row distance,
wherein visual emission elements from among the plurality of visual emission elements along each column from among the plurality of columns of visual emission elements are separated by a column distance, and
wherein the row distance is equal to the column distance.

15. The visual display panel of claim 14, wherein the row distance and the column distance is six (6) millimeters (mm) or nine (9) mm.

16. A venue, comprising:
a visual display comprising:
a plurality of visual emission elements situated along a plurality of rows of visual emission elements and a plurality of columns of visual emission elements,
a plurality of openings, at least one opening from among the plurality of openings being configured to pass sound through the visual display, wherein the at least one opening traverses from a corresponding first set of visual emission elements from among the plurality of visual emission elements along a corresponding first column of visual emission elements from among the plurality of columns of visual emission elements through a corresponding second set of visual emission elements from among the plurality of visual emission elements along corresponding adjacent rows of visual emission elements from among the plurality of rows of visual emission elements to a corresponding third set of visual emission elements from among the plurality of visual emission elements along a corresponding second column of visual emission elements from among the plurality of columns of visual emission elements; and a loudspeaker situated behind the visual display, the loudspeaker being configured to generate the sound that passes through the visual display.

17. The venue of claim 16, wherein the plurality of rows of visual elements and the plurality of columns of visual emission elements are arranged to form a rectangular array of visual emission elements.

18. The venue of claim 16, wherein the plurality of openings are configured to be a plurality of geometric shapes, the plurality of geometric shapes traversing from the corresponding first set of visual emission elements along the corresponding first column of visual emission elements through the corresponding second set of visual emission elements along the corresponding adjacent rows of visual emission elements to the corresponding third set of visual emission elements along the corresponding second column of visual emission elements.

19. The visual display of claim 18, wherein the plurality of geometric shapes is radially shaped along the corresponding first column of visual emission elements in accordance with a radius and along the corresponding second column of visual emission elements in accordance with the radius.

20. The venue of claim 16, wherein the loudspeaker is configured to generate the sound that is associated with an event being hosted by the venue.

\* \* \* \* \*